No. 814,499. PATENTED MAR. 6, 1906.
E. C. ABRAHAM.
CLOD CRUSHER AND HARROW.
APPLICATION FILED MAY 27, 1905.

Witnesses
Wm. Koerth.
A. M. Langley.

Inventor
E. C. Abraham,
By Victor J. Evans
Attorney

UNITED STATES PATENT OFFICE.

EDWARD C. ABRAHAM, OF SANTA CRUZ, CALIFORNIA.

CLOD-CRUSHER AND HARROW.

No. 814,499.

Specification of Letters Patent.

Patented March 6, 1906.

Application filed May 27, 1905. Serial No. 262,649.

*To all whom it may concern:*

Be it known that I, EDWARD C. ABRAHAM, a citizen of the United States, residing at Santa Cruz, in the county of Santa Cruz and State of California, have invented new and useful Improvements in Clod-Crushers and Harrows, of which the following is a specification.

The invention relates to an improvement in farming implements, and particularly to a combined clod-crusher and harrow.

The main object of the present invention is the production of an implement of the character described, in which the parts are so arranged that it may be adapted for use as a clod-crusher or as a harrow.

The invention will be described in the following specification, reference being had to the accompanying drawings, wherein—

Figure 1:
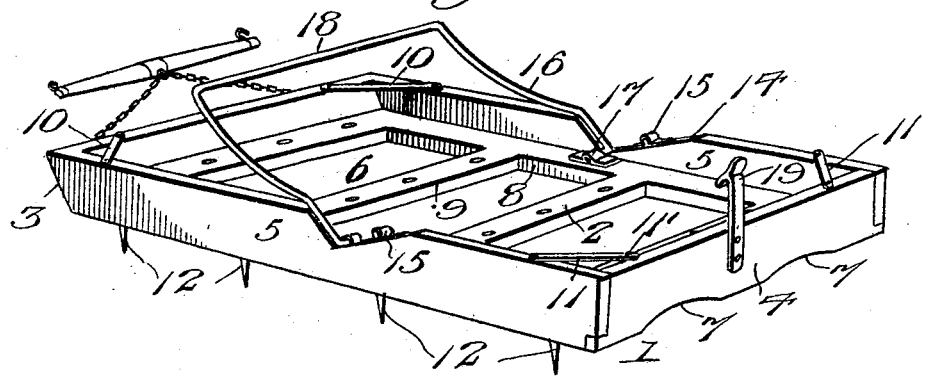
Figure 2:
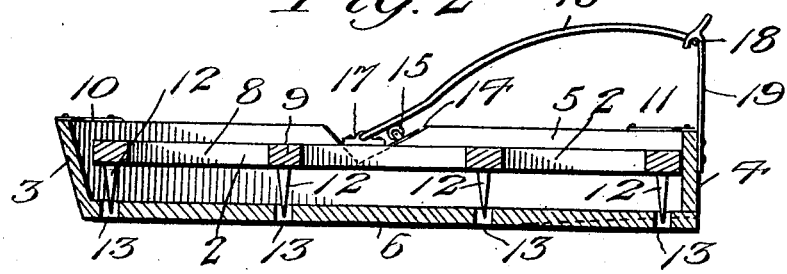

Figure 1 is a perspective view of an implement constructed in accordance with my invention, the parts being shown in the position occupied in the device as arranged for use as a harrow; and Fig. 2 is a longitudinal central section of the same, the parts being in a position to adapt the device for use as a clod-crusher.

Referring to the drawings, wherein like reference-numerals indicate like parts throughout both views, my improved implement comprises a clod-crusher 1 and a harrow 2, which are combined and arranged so that either one or the other may be in position for use.

The clod-crusher comprises a rectangular box-like structure having front and rear ends 3 and 4, sides 5, and a bottom 6, each of which parts is preferably of solid material, as illustrated, though the bottom may, if preferred, be of tongue-and-grooved material to provide a solid bottom. The front wall 3 is preferably inclined outwardly and upwardly from the vertical, as illustrated, to provide for riding stones or the like without danger of breaking the pressure. The rear wall 4 is provided with recessed portions 7 on the lower edge thereof, whereby to permit the passage of material collected beneath the crusher in an obvious manner.

The harrow 2 comprises side strips 8 and cross-strips 9, the frame thus provided being of a size to fit loosely within the crusher. Retaining-strips 10 are secured adjacent to the meeting end of the side and front wall of the crusher, projecting angularly above the harrow to prevent its accidental removal from the crusher. Similar strips 11 are arranged on the side walls and rear wall of the crusher, these strips, however, being adjustably connected with said rear wall through the medium of a pin 11', whereby said strips may be swung laterally from above the harrow to permit removal of the same when desired. Teeth 12 of the usual or preferred form project downwardly from the cross-pieces 9 of the harrow-frame, being adapted when moved into operative position to protect openings 13 properly arranged in the bottom 6 of the clod-crusher, as clearly shown in Fig. 2.

Each of the side walls 5 of the crusher is formed about central of its length with a V-shaped depression 14, having walls of unequal length, on the longer or rear wall of which is mounted a roller 15, designed to serve as a fulcrum for the operating-lever hereinafter described.

16 represents the operating-lever, having right-angled ends mounted in bearings 17, secured to the harrow-frame immediately adjacent to the V-shaped opening 14 in the clod-crusher. The lever projects straight from said bearings for a short distance and from the end of the straight projections is bent on a curve to the handle-bar 18. By preference the lever is formed of a single length of material or may be formed of piping secured by suitable couplings, the handle-bar 18 extending transversely of the clod-crusher with the terminals of the lever engaging the harrow on opposite sides thereof and the plane portions of the lever immediately adjacent to said terminals overlying the walls of the recess 14. Arrangement of the parts is such that when said lever is projected in forward position the harrow-frame will rest on the bottom of the clod-crusher, with the teeth 12 projecting through the openings 13 therein a sufficient distance for service as a harrow. When it is desired, however, to adapt the device for use as a clod-crusher, the lever 16 is swung in a rearward direction until the handle-bar 18 engages the lip of a catch 19, secured to the rear frame of the clod-crusher. In this movement of the lever the straight portions thereof will fulcrum on the rollers 15 and raise the harrow within the clod-crusher, whereby the teeth 12 are withdrawn through the openings 13 and within the body of the clod-crusher.

The device is effective for the purpose described, it being understood that the teeth 12 of the harrow are readily freed from accumulated grass-roots or the like by simply moving the lever 16 rearward to elevate the teeth and that when in said elevated position the device as a whole may be readily transported from place to place without operation of the harrow-teeth.

In use as a clod-crusher the harrow of course is withdrawn to inoperative position and the front wall 3 and bottom 6 of the crusher will be found effective for breaking up the clods of earth. If desirable, the bottom of the crusher may be shod with iron or other resisting material to increase its efficiency.

The harrow may be removed from the drag and the drag used as an ordinary stone-boat. Also, the drag with the harrow included may be used as a sled for hauling the plow or other implement to the place of use.

Having thus described the invention, what is claimed as new is—

1. In a farming implement, a clod-crusher having closed bottom, sides and ends, the sides being formed with V-shaped recesses, a harrow-frame mounted within the clod-crusher, and a lever connected with the frame and bearing on the V-shaped recess, whereby in the operation of said lever the harrow may be moved to operative position.

2. A farming implement comprising a clod-crusher having closed bottom, sides and ends, the front end of the crusher being inclined from the vertical, the side walls of the crusher being formed with V-shaped recesses, a harrow-frame mounted within the clod-crusher, a lever pivotally connected to said frame and bearing above the wall of said V-shaped recess, and a device carried by said V-shaped recess to provide a fulcrum for the lever.

3. A farming implement comprising a clod-crusher having closed bottom, sides and ends, the front end of the crusher being inclined from the vertical, the side walls of the crusher being formed with V-shaped recesses, a harrow-frame mounted within the clod-crusher, a lever pivotally connected to said frame and bearing above the wall of said V-shaped recess, and a roller mounted in said recess to provide a fulcrum for the lever.

4. A farming implement comprising a clod-crusher having closed bottom, sides and ends, the front end of the crusher being inclined from the vertical, the side walls of the crusher being formed with V-shaped recesses, a harrow-frame mounted within the clod-crusher, a lever pivotally connected to said frame and bearing above the wall of said V-shaped recess, a roller mounted in said recess to provide a fulcrum for the lever, and a catch to hold the lever in operative position.

In testimony whereof I affix my signature in presence of two witnesses.

EDWARD C. ABRAHAM.

Witnesses:
   L. J. DAKE,
   M. GERTRUDE RICKEY.